US005550193A

United States Patent [19]

Chiu et al.

[11] Patent Number: 5,550,193
[45] Date of Patent: Aug. 27, 1996

[54] MELT FRACTURE ELIMINATION IN FILM PRODUCTION

[75] Inventors: Ramen Chiu, Marysville, Mich.; Joseph W. Taylor, Halton Hills, Canada; David L. Cooke, Calgary, Canada; Shivendra K. Goyal, Calgary, Canada; Robert E. Oswin, Calgary, Canada

[73] Assignee: Novacor Chemicals Ltd., Calgary, Canada

[21] Appl. No.: 350,630

[22] Filed: Dec. 7, 1994

[51] Int. Cl.$^6$ .............................. C08L 27/12; C08L 71/02; C08L 23/04; C08L 23/10

[52] U.S. Cl. .................... 525/199; 525/240; 524/399; 524/400; 524/430; 524/432; 428/378

[58] Field of Search ........................... 428/378; 525/240, 525/199; 524/432, 430, 399, 400

[56] References Cited

U.S. PATENT DOCUMENTS 3,125,547  3/1964  Blatz et al. ........................... 260/45.5
4,855,360  8/1989  Duchesne et al. ..................... 525/187
4,863,983  9/1989  Johnson et al. ....................... 524/140
4,983,677  1/1991  Johnson et al. ....................... 525/127
5,250,593  10/1993  Ishii et al. ............................. 524/100

FOREIGN PATENT DOCUMENTS 0060673  9/1982  European Pat. Off. .

OTHER PUBLICATIONS

*Hawley's Condensed Chemical Dictionary,* Richard J. Lewis, Sr., 12th ed., 1993, pp. 1246–1247.
*Influence of Polyolefin Additives on the Performance of Flurocarbon Elastomer Process Aids,* Antec 88, Apr. 18–21, 1988, by B. V. Johnson and J. M. Kunde Mar. 1988.

*Primary Examiner*—W. Robinson H. Clark
*Attorney, Agent, or Firm*—Kenneth H. Johnson

[57] ABSTRACT

The present invention relates to a polyolefin composition, having good extrusion characteristics. The composition comprises a fluoropolymer and one or more of a low molecular weight polyalkylene oxide, an ultra-violet light stabilizer and a metal oxide. The blend is suitable for making blown film and coated wire and cable and optical fibre products.

16 Claims, No Drawings

MELT FRACTURE ELIMINATION IN FILM PRODUCTION

FIELD OF THE INVENTION

The present invention relates to polyolefins suitable for use in extrusion processes. More particularly the present invention relates to polyolefin compositions suitable for the manufacture of blown film having a good surface appearance.

BACKGROUND OF THE INVENTION

In the manufacture of extruded polymers there are a number of surface defects referred to as sharkskin, snakeskin and orange peel which all are related to the rheology of the polymer melt and in particular the melt fracture of the polymer. Melt fracture arises when the shear rate at the surface of the polymer is sufficiently high that the surface of the polymer begins to fracture. That is there is a slippage of the surface of the extruded polymer relative the body of the polymer melt. The surface generally can't flow fast enough to keep up with the body of the extrudate and a fracture in the melt occurs generally resulting in a loss of surface properties for the extrudate.

U.S. Pat. No. 3,125,547 issued Mar. 17, 1964 assigned to E.I. DuPont du Nemours and Company discloses blends of polyethylene and small amounts of fluoropolymers to provide a smooth surface on extrudate at high extrusion speeds.

U.S. Pat. No. 3,222,314 issued Dec. 7, 1965, assigned to E.I. DuPont du Nemours and Company discloses blends of polyethylene and low molecular weight polyethylene glycol to provide a heat sealable film suitable for printing.

European Patent Application 0 060 673 published 22.09.82 discloses the use of low molecular weight polyalkylene oxides as a processing aid in the manufacture of extruded polyolefins.

There are a series of patents in the name of the Minnesota Mining and Manufacturing Company relating to the use of a combination of polyalkylene oxides and fluorocarbon polymers as a process aid in extrusion of polyolefins. These patents include U.S. Pat. No. 4,855,360 issued Aug. 8, 1989 which discloses and claims a composition of matter comprising the polyolefin and the process aid; U.S. Pat. No. 5,015,693 which claims the process aid per se; U.S. Pat. Nos. 4,863,983 issued Sep. 5, 1989 and U.S. Pat. No. 4,983,677 issued Jan. 8, 1991 which disclose and claim the use of an organophosphite in conjunction with the fluoropolymer as a process aid.

The first DuPont patent, the Union Carbide Patent and the first two 3M patents disclose that the additives may be used in conjunction with conventional heat and light stabilizers. The last two 3M patents teach that the phosphite is added as the heat and light stabilizer. Further, the paper "The Influence of Polyolefin Additives on the Performance of Fluorocarbon Elastomer Process Aids" by B. V. Johnson and J. M. Kunde from 3M Industrial Chemical Products Division discloses that there may be antagonistic effects between some heat and light stabilizers and the process aid and some antagonistic effects between zinc oxide and the process aid. At best the prior art suggests there may be a problem but does not suggest any particular solution.

Surprisingly the inventors have found that there is a preferred combination of heat and light stabilizers and process aids. Further, the inventors have found that there is a synergistic effect between zinc oxide and the process aid.

The present invention seeks to provide a preferred composition of an extrudable polymer, a process aid and a heat and light stabilizer.

SUMMARY OF THE INVENTION

In accordance with the broadest aspects of the present invention there is provided an extrudable composition comprising;
  (i) a predominant amount of an olefin polymer;
  (ii) from 0.01 to 1 weight % of fluoropolymer having an atomic ratio of fluorine to carbon of at least 1:2; and
at least one components in the specified amount selected from the group consisting of;
  (iii) from 0.01 to 1 weight % of a blend of dimethyl succinate and 4-hydroxy -2,2,6,6- tetramethyl-1-piperidine ethanol; provided that if component (iii) is present the weight ratio of component (iii) to component (ii) is from 3:1 to 7:1, preferably from 4:1 to 5:1;
  (iv) from 0.01 to 1 weight % of a chemical selected from the group consisting of poly $C_{2-6}$ ethylenically unsaturated glycols, $C_{1-4}$ alkyl ethers of poly $C_{2-6}$ ethylenically unsaturated glycols, and mixtures thereof, said chemical having a weight average molecular weight less than 20,000; and
  (v) at least 25 parts per million (ppm), preferably from 50 to 500, most preferably from 100 to 300 parts per million (ppm) of a metal oxide, most preferably zinc oxide.

A further embodiment of the present invention provides an extrudable composition comprising:
  (i) a predominant amount of an olefin polymer;
  (ii) from 0.01 to 1 weight % of fluoropolymer having an atomic ratio of fluorine to carbon of at least 1:2; and
  (iii) from 0.01 to 1 weight % of a blend of dimethyl succinate and 4-hydroxy -2,2,6,6- tetramethyl-1-piperidine ethanol
wherein the weight ratio of component (iv) to component (iii) is from 3:1 to 7:1.

A further embodiment of the present invention provides the above composition (preferably wherein the olefin is prepared by a gas phase process) and further comprising:
  from 0.01 to 1 weight % of a chemical selected from the group consisting of poly $C_{2-6}$ ethylenically unsaturated glycols, $C_{1-4}$ alkyl ethers of poly $C_{2-6}$ ethylenically unsaturated glycols, and mixtures thereof, said chemical having a weight average molecular weight less than 20,000.

In a further embodiment the present invention comprises the above composition together with at least 25 ppm of a metal oxide.

In a still further embodiment of the present invention there is provided an extrudable composition comprising:
  (i) a predominant amount of an olefin polymer;
  (ii) from 0.01 to 1 weight % of fluoropolymer having an atomic ratio of fluorine to carbon of at least 1:2; and
  (iii) at least 25 ppm of a metal oxide.

The present invention further provides an extrudable composition comprising:
  (i) a predominant amount of an olefin polymer;
  (ii) from 0.01 to 1 weight % of fluoropolymer having an atomic ratio of fluorine to carbon of at least 1:2;
  (iii) from 0.01 to 1 weight % of a chemical selected from the group consisting of poly $C_{2-6}$ ethylenically unsaturated glycols, $C_{1-4}$ alkyl ethers of poly $C_{2-6}$ ethylenically unsaturated glycols and mixture thereof, said chemical having a weight average molecular weight less than 20,000; and (iv) at least 25 ppm of a metal oxide.

In a further embodiment the present invention provides a blown film, a coated electrical of the above composition.

DETAILED DESCRIPTION

The major or predominant component in the compositions of the present invention is an extrudable polymer. The predominant component is present in an amount of at least about 98% by weight (weight %) of the base composition. That is the composition may include pigments and fillers in a typical amount but they would not be considered a part of the base component.

The extrudable polymer may be a number of extrudable polymers such as polyolefins including those substituted by an aromatic radical (e.g. styrene) or an unsubstituted polyolefin such as polyethylene or a copolymer such as an ethylene alpha olefin copolymer. Typically the olefin polymer comprises at least 85 weight % of one or more $C_{2-3}$ alpha olefins and up to 15 weight % of one or more $C_{4-8}$ alpha olefins. Preferably, the olefin comprises at least 90 weight % of ethylene and up to 10 weight % of one or more $C_{4-8}$ alpha olefins. Suitable C2-3 alpha olefins are ethylene and propylene. Suitable $C_{4-8}$ alpha olefins include butene, 4-methyl pentene, hexene, and octene.

The olefin polymer may be prepared by conventional processes. In the case of olefins substituted by aromatic radicals such as styrene the polymer may be polymerized in a bulk or solution polymerization initiated either thermally or by free radical polymerization. In the case of unsubstituted olefin polymers the polymerization may be in gas phase (that is at relatively low pressures below 500 psi, preferably below about 250 psi; at temperatures below about 130° C., and using a particulate catalyst in a fluidized bed such as the process patented by Union Carbide Corporation), to produce products such as high density (e.g. having a density greater than 0.935, preferably greater than 0.940 g/cc) and low density polyethylene (having a density from about 0.910 to 0.935 g/cc); in solution (a process at high temperatures typically from about 130 to about 250, preferably not greater than about 220° C., comprising dissolving ethylene and other comonomer(s) in a solvent such as hexane and the presence of a coordination catalyst such as that disclosed in a number of patents in the name of DuPont) (either low pressure low to medium density polyethylene or high pressure low density polyethylene) or slurry polymerization (such as polypropylene or ethylene copolymers) initiated by a co-ordination catalyst or in the case of high pressure polymerization by free radicals. The details of such types of polymerization are generally known to those skilled in the art of polymerization.

Depending on the type of polymerization and the olefin the olefin polymer may have a molecular weight (weight average—Mw) from about 100,000 up to 1,000,000 typically from about 150,000 to 350,000.

The second component in the compositions of the present invention is a fluoropolymer having an atomic ratio of fluorine to carbon of at least 1:2; preferably 1:1. Typically, the fluoropolymer is a polymer comprising one or more monomers selected from the group consisting of perfluoropropylene, vinylidene fluoride, tetrafluoroethylene, chlorotrifluoroethylene, pentafluoropropylene and hexafluoropropylene. Preferably the fluoropolymer is a copolymer comprising from 50 to 85 mole % of vinylidene fluoride and from 15 to 50 mole % of one or more monomers selected from the group consisting of tetrafluoroethylene and perfluoroethylene.

The fluoropolymer component is present in the compositions of the present invention in an amount from 0.01 to 1, preferably 0.05 to 0.10% by weight based on the total weight of the composition (weight %).

A third component in the blends of the present invention is the ultraviolet light (UV) stabilizer. The UV stabilizer is a blend of dimethyl succinate and 4-hydroxy-2,2,6,6- tetramethyl-1-piperidine ethanol (in a weight ratio from 0.1 to 1 to 1 to 0.1 preferably from 0.25 to 1 to 1 to 0.25). The UV stabilizer is present in the compositions of the present invention in an amount such that the weight ratio of component (ii) (fluoropolymer) to component (iii) (UV stabilizer) is from 3:1 to 7:1, preferably from 4:1 to 5:1.

A fourth component in the compositions of the present invention is a chemical selected from the group consisting of poly $C_{2-6}$ ethylenically unsaturated glycols (or sometimes called a poly $C_{2-6}$ alkylene glycol), $C_{1-4}$ alkyl ethers of poly $C_{2-6}$ ethylenically unsaturated glycols, and mixtures thereof, said chemical having a molecular weight less than 20,000. Preferably the weight average molecular weight (Mw) of the glycol is less than 10,000. Most preferably the glycol has a molecular weight (Mw) from 2,500 to 6,000. Suitable glycols include polyethylene glycol and polypropylene glycol, most preferably polyethylene glycol comprising on average from 40 to 120 ethylene oxide units. Suitable ethers include methyl ethers comprising on average from 30 to 80 ethylene oxide units. Applicants are using the phrase "on average" as the glycols are mixtures and are best characterized by an average number of alkylene oxide units in the composition while there may be in the composition individual glycol molecules having a greater or lesser number of alkylene oxide units.

The poly $C_{2-6}$ ethylenically unsaturated glycols and ethers thereof may be used in the compositions of the present invention in an amount from 0.01 to 1, preferably 0.05 to 0.10% based on the weight of the total composition (weight %).

Typically the fourth component is used with polyolefins prepared using a gas phase process. There are different molecular weight distributions between polyolefins prepared in a gas phase process and those prepared in a solution phase process.

As noted above the compositions of the present invention may further include fillers, antioxidants (at least a primary and optionally a secondary antioxidant), pigments, opacifying agents and other adjuvants. For film applications preferably no pigment or filler is added and the film is clear or relatively clear. In other applications such as wire and cable (electrical or optical) the compound may contain a pigment/ filler such as carbon black and other adjuvants (in these types of applications the unsubstituted olefin polymer may be grafted by extrusion with a functional ethylenically unsaturated monomer such as maleic anhydride in the presence of a free radical agent such as a peroxide).

Typically if an antioxidant (primary alone or optionally in combination with a secondary antioxidant) is used it is used in an amount from about 0.01 to 2, preferably 0.05 to about 1 weight %. Fillers may be incorporated into the compositions of the present invention in amounts up to about 50 weight %, preferably less than about 30 weight %.

In accordance with the present invention it is sometimes desirable to incorporate a weak metal base into the compositions. The metal base may be a metal oxide of an alkaline earth or a transition metal. The metal base may be incorporated into the composition in an amount from at least 25 (up to an economically effective limit e.g. until there is no cost benefit to inclusion of further metal base ), preferably from 50 to 500, most preferably from 1 00 to 300 parts per million (ppm). Useful metal bases include hydrotalcite ($Mg_6Al_2(OH)_{16} CO_3 \cdot 4H_2O$) and zinc oxide, preferably zinc oxide. The metal oxide may be included in a master batch comprising antioxidant, and low molecular weight poly $C_{2-6}$ ethylenically unsaturated glycol. A suitable master batch composition might comprise from 20 to 30 weight % of an antioxidant (such as IRGANOX™ (of Ciba Geigy)) from 10 to 20 weight % of zinc oxide and the balance of a poly $C_{2-6}$ ethylenically unsaturated glycol (such as CARBOWAX™ (of Union Carbide)). However, the metal oxide may also be used in accordance with the present invention in compositions which do not contain the above noted UV stabilizer.

Typically, the polymer compositions of the present invention will be prepared by melt blending. There are several methods which could be used to produce the compositions of the present invention. All the components may be dry blended in the required weight ratio in a suitable device such as a tumble blender. The resulting dry blend is then melted in suitable equipment such as an extruder. A master batch could be prepared with some of the olefin and the other ingredients. The master batch is then fed to an extruder and melt blended. In a third method the dry components of the blend may be metered directly into an extruder.

The extruder may be a twin or single screw extruder. If it is a twin screw extruder it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180 to 210, preferably from 190° to 200° C. The screw speed will be from 120 to 150, preferably from 120 to 130 RPM's. The back pressure on the extruder will be from about 1000 to 1300, preferably from 1100 to 1250 psi. For commercial equipment the extruder may operate at higher temperatures (i.e. up to 300° C.) and at lower screw speeds. As noted above the specific conditions for the operation of any specific extruder can readily be determined by one skilled in the art by non-inventive testing in view of the above envelope of conditions.

The extruder will typically extrude the polymer composition as strands which are then cooled and cut into pellets for subsequent use, typically film extrusion.

The film extruder may also be a single or twin screw extruder. The die may be a slot die or it may be an annular ring die extruding a film of the polymer alloy about a stable bubble of air. The film is collapsed after passing over or about the bubble. For laboratory scale film extrusion the extruder may be operated within the envelop of parameters as set forth in the examples.

The present invention will be illustrated by the following non-limiting examples.

EXAMPLE 1

In the examples the following ingredients were used:

Polyolefin. A commercially available low density (0.921 $g/cm^3$) polyolefin (i.e. ethylene/butene copolymer) sold by Novacot Chemicals Ltd. under the trade mark NOVAPOL Y821.

Primary antioxidant, a hindered phenol, sold under the trade name I 1076 (IRGANOXT™). Secondary antioxidant sold under the trade name W399. The fluoropolymer was either the fluoropolymer sold by DuPont under the trade name VITON™ or the process aid sold by Minnesota Mining and Manufacturing Company under the trade mark FX-9613. The former is a polyethylene based fluoropolymer and the latter is believed to be a vinylidene fluoride based polymer. Chimassorb 944 was used as a control UV stabilizer.

A series of compounds were compared comprising the following formulations in parts by weight (e.g. grams):

| | |
|---|---|
| Y821 | 99.71 |
| I1076 | .03 |
| W399 | .06 |
| Fluoropolymer | .05 |
| Additive | .15 |

As noted above the additive was either Chimassorb 944 or the blend of the present invention (dimethyl succinate with 4-hydroxy-2,2,6,6 tetramethyl-1-pyridine ethanol). The fluoropolymer was either VITON™ or FX-9613. The above formulation was prepared using a master batch procedure. The blend was then run on blown film extrusion equipment under the following conditions:

| | | |
|---|---|---|
| Melt Temperature | 434° F. | (about 225° C.) |
| Output | 66.5 lbs/hour | (30 kg/hour) |
| Die Gap | 35 mil | |
| Frost Line | 17 inches | (42.5 cm) |
| Layflat | 12 inches | (30 cm) |
| Line Speed | 50.8 ft/min | (15.2 m/min) |

The samples were run to cause melt fracture and the time up to 60 minutes (e.g. if it took more than 60 minutes to clear hard melt fracture no number is given) to clear hard melt fracture was measured and the % melt fracture after 60 minutes of running was also measured. The results are set forth in table 1 below.

TABLE 1

| FORMULATION | | | | |
|---|---|---|---|---|
| FX-9613 | yes | yes | no | no |
| VITON | no | no | yes | yes |
| 944 | yes | no | yes | no |
| ADDITIVE | no | yes | no | yes |
| TIME TO CLEAR MF | | 0.5% at 50' | | 50' |
| AFTER 60' % MF | 6.57 | 0 | 14.9 | 0 |

The above data shows the compositions using the additive of the present invention has a lower or better melt fracture than the control.

EXAMPLE 2

The above experiment was essentially repeated except that the formulation (in parts by weight e.g. grams) was as follows:

| | |
|---|---|
| Y821 | 99.51 |
| W399 | .12 |
| FX-9613 | 0.45 |
| 944 or Additive | .20 |
| MX | .125 |

The MX is a master bath comprising about 65% CARBOWAX™ (polyethylene glycol having a molecular weight (Mw) of less than 5000); about 22% of an antioxidant and about 12% zinc oxide.

In the example the time to clear hard MF was measured for the 944 the hard MF was 0.32% at 35 minutes and for the compositions according to the present invention it was 20 minutes to totally clear.

The above shows the addition of CARBOWAX™ improves (lowers) the melt fracture in the compositions of the present invention.

EXAMPLE 3

In this example the benefit of using zinc oxide instead of zinc stearate in the formulation is shown. Two formulations (in parts by weight, e.g. grams) as shown below were prepared.

| | Formulation 1 | Formulation 2 |
|---|---|---|
| Y821 | 99.46 | 99.425 |
| Silica | 0.25 | 0.25 |
| I1076 | 0.03 | 0.03 |
| W399 | 0.12 | 0.12 |
| CARBOWAX ™, PEG | 0.08 | 0.08 |
| Fluoropolymer | 0.045 | 0.045 |
| Zinc Oxide | 0.015 | — |
| Zinc Stearate | — | 0.05 |

The fluoropolymer used was FX-9613. The CARBOWAX™ used was polyethylene glycol having molecular weight (Mw) of less than 5000.

The above polymer compositions were prepared by melt blending in an extruder as described previously. The blended materials were then tested on a Ceast Capillary Rheometer for their viscosity behaviour at several shear rates. The shear rates at the onset of melt fracture were also measured. A circular tungsten carbide capillary die of 1.0 mm diameter and 20 mm length was used for these measurements.

Table 2 shows the measured values of shear viscosity at different shear rates and the shear rate at the onset of melt fracture for the two formulations.

TABLE 2

| | Shear Viscosity (Pa.S) | |
|---|---|---|
| Shear Rate (S$^{-1}$) | Formulation 1 | Formulation 2 |
| 19.27 | 2627 | 3320 |
| 38.59 | 1634 | 2572 |
| 57.66 | 1263 | 1956 |
| 76.58 | 1057 | 1607 |
| 96.13 | 915.8 | 1399 |
| 134.20 | 781.1 | 1141 |
| 191.80 | 673.1 | 913.1 |
| 307.00 | 574.6 | 686.2 |

TABLE 2-continued

| | Shear Viscosity (Pa.S) | |
|---|---|---|
| Shear Rate (S$^{-1}$) | Formulation 1 | Formulation 2 |
| 460.60 | 504.6 | 549.3 |
| 659.20 | 446.9 | 458.2 |
| Shear Rate at onset of melt fracture | >1150 | <950 |

The above data (Table 2) shows that formulation 1 with zinc oxide provides much lower values of viscosity compared to formulation 2 with zinc stearate at any given shear rate shown in Table 2. The above data also shows that the onset of melt fracture occurs at a higher shear rate with formulation 1 than the shear rate with formulation 2. These data clearly demonstrate the benefit of using zinc oxide instead of zinc stearate in the preferred formulation.

What is claimed is:

1. An extrudable composition consisting essentially of:
   (i) a predominant amount of an olefin polymer comprising at least 85 weight % of one or more $C_{2-3}$ alpha olefins and up to 15 weight % of one or more $C_{4-8}$ olefins;
   (ii) from 0.01 to 1 weight % of a fluoropolymer having an atomic ratio of fluorine to carbon of at least 1:2;
   (iii) from 0.01 to 1 weight % of a blend of dimethyl succinate and 4-hydroxy -2,2,6,6-tetramethyl-1-piperidine ethanol in a weight ratio from 0.1 to 1 to 1 to 0.1 to provide a weight ratio of component (iii) to component (ii) from 3:1 to 7:1;
   (iv) from 0.01 to 1 weight % of a $C_{2-6}$ alkylene glycol or a $C_{1-4}$ alkyl ether thereof, having a weight average molecular weight of less than 20,000 or mixtures thereof;
   (v) from 25 to 500 ppm based upon the total composition of a metal oxide selected from the group consisting of ZnO and hydrotalcite; and
   (vi) from 0.01 to 2 weight % of a hindered phenol antioxidant.

2. The composition according to claim 1, wherein said fluoropolymer is a polymer comprising one or more monomers selected from the group consisting of perfluoropropylene, vinylidene fluoride, tetrafluoroethylene, chlorotrifluoroethylene, pentafluoropropylene and hexafluoropropylene.

3. The composition according to claim 2, wherein said fluoropolymer is a copolymer comprising from 50 to 85 mole % of vinylidene fluoride and from 15 to 50 mole % of one or more monomers selected from the group consisting of tetrafluoroethylene and perfluoroethylene.

4. The composition according to claim 3, wherein said olefin comprises at least 90 weight % of ethylene and up to 10 weight % of one or more $C_{4-8}$ alpha olefins.

5. The composition according to claim 4, wherein the weight ratio of component (iii) to (ii) is from 4:1 to 5:1.

6. The composition according to claim 5, wherein component (iii) is present in an amount from 0.05 to 0.10 weight %.

7. The composition according to claim 6, wherein said metal oxide is zinc oxide and is present in an amount from 100 to 300 ppm.

8. The composition of claim 1, in the form of a blown film.

9. An electrical wire or cable coated with the composition of claim 1.

10. An optical cable coated with the composition of claim 1.

11. The composition according to claim 7, wherein component (iv) is a poly $C_{2-4}$ alkylene glycol having a molecular weight of less than 10,000.

12. The composition according to claim 11, wherein said poly $C_{2-4}$ alkylene glycol comprises on average from 40 to 120 ethylene oxide units.

13. The composition according to claim 12, wherein said poly $C_{2-4}$ alkylene glycol is polyethylene glycol having a molecular weight from 2,500 to 6,000.

14. The composition according to claim 7, wherein component (iv) is a $C_{1-4}$ alkyl ether of a poly $C_{2-4}$ alkylene glycol and has a weight average molecular weight less than 10,000.

15. The composition according to claim 14, wherein said $C_{1-4}$ alkyl ether of a poly $C_{2-4}$ alkylene glycol comprises on average from 30 to 80 ethylene oxide units.

16. The composition according to claim 15, wherein said $C_{1-4}$ alkyl ether of a poly $C_{2-4}$ alkylene glycol is a methyl ether of-ethylene glycol.

* * * * *